May 12, 1953 G. T. DOWNEY ET AL 2,638,228
FLUID FILTER
Filed Dec. 26, 1950 5 Sheets-Sheet 1
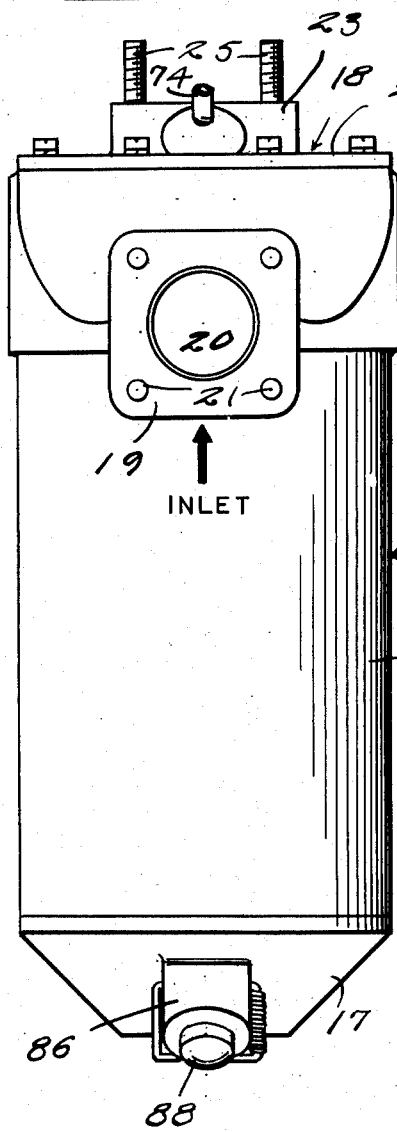
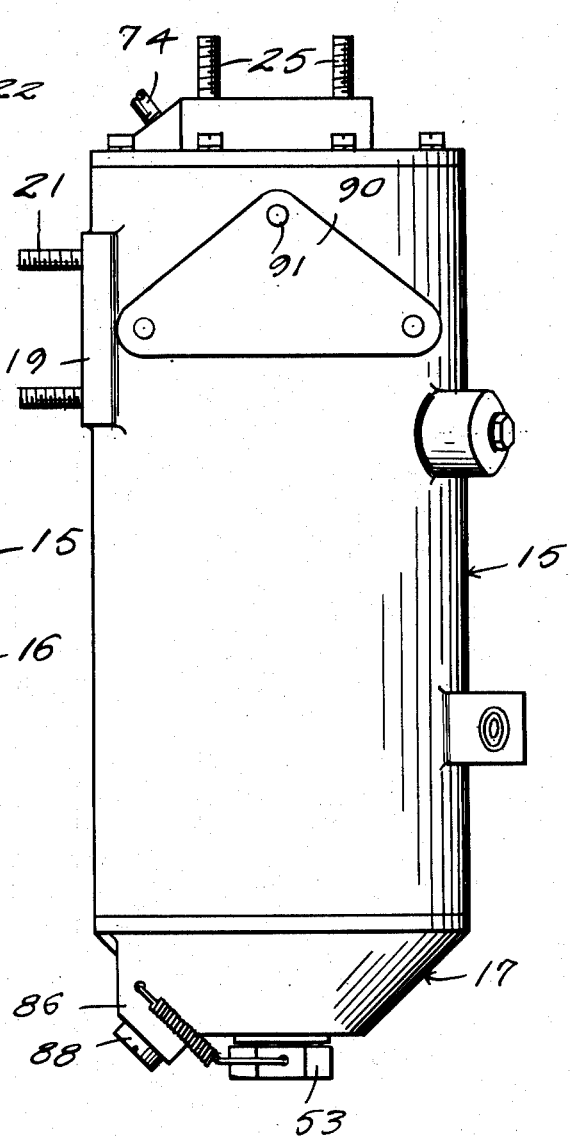
INVENTORS
G. T. Downey
S. N. Rosengren
R. E. Forrester
BY Kimmel & Crowell
ATTORNEYS

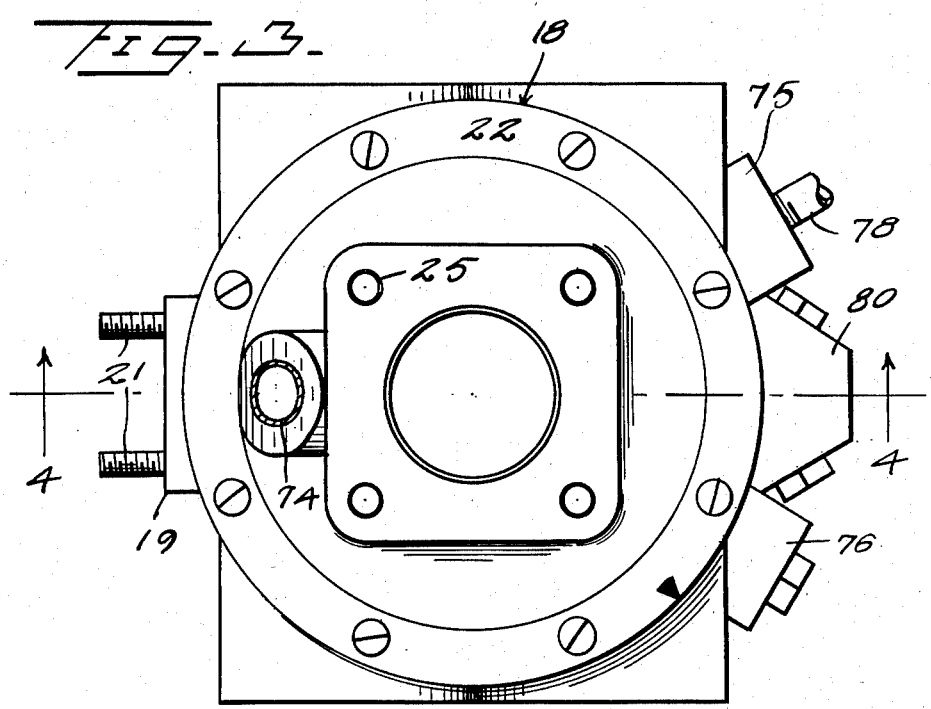
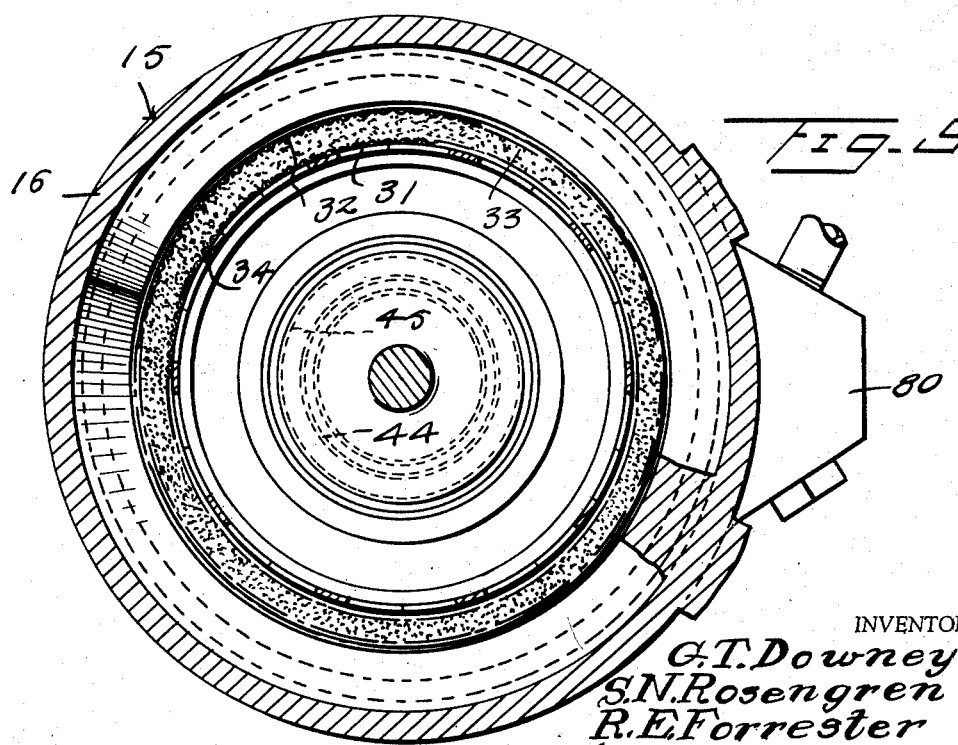

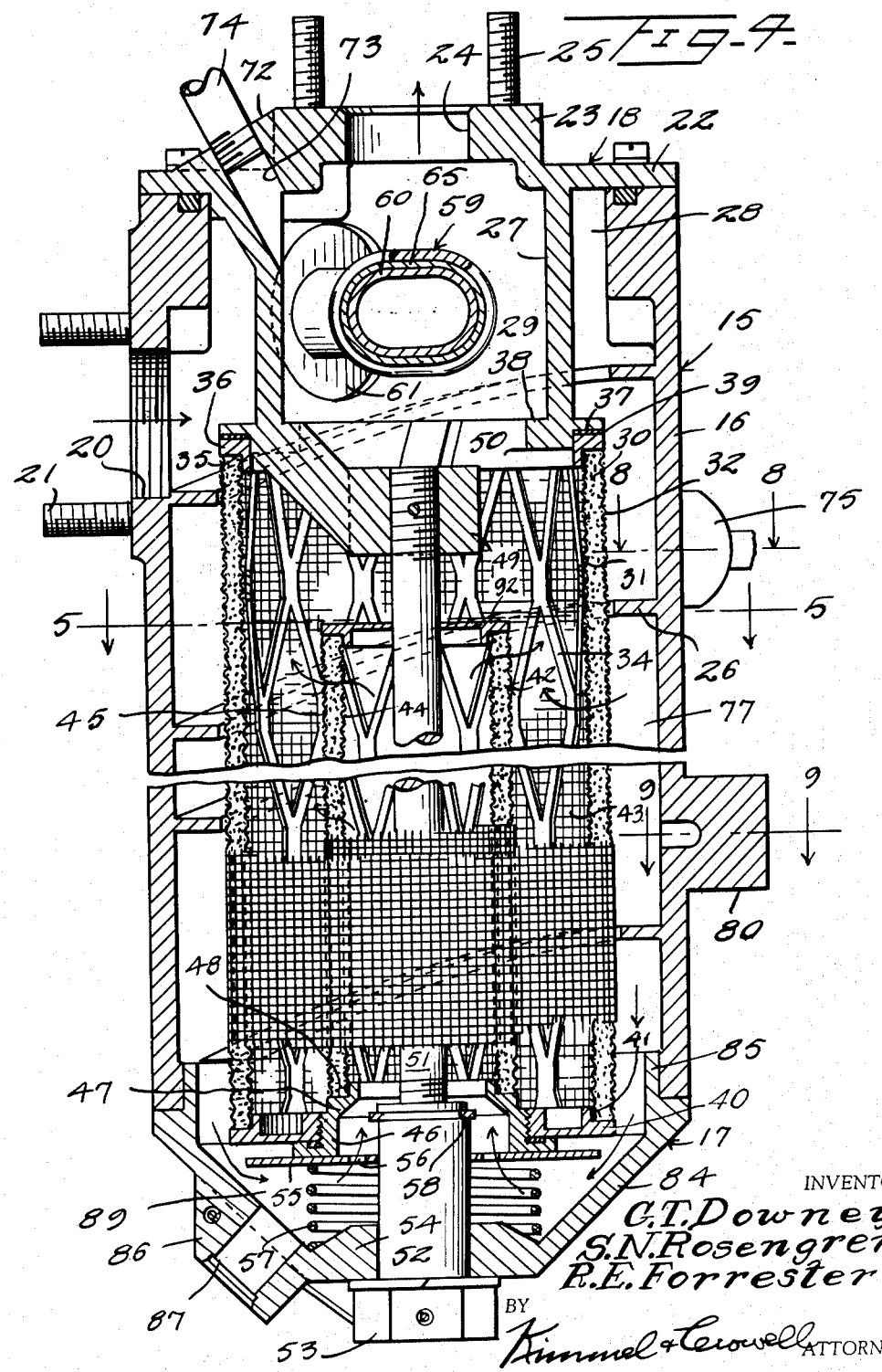

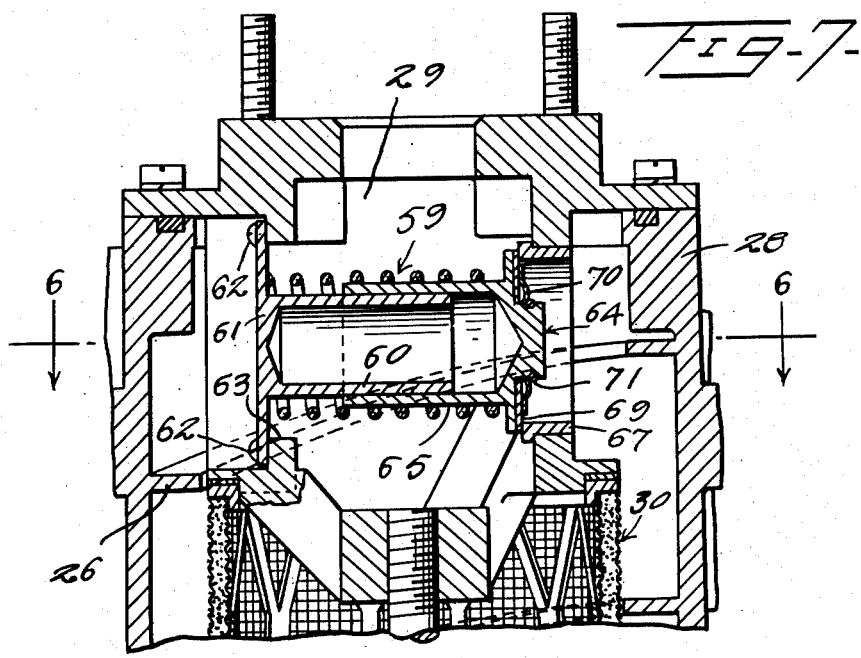
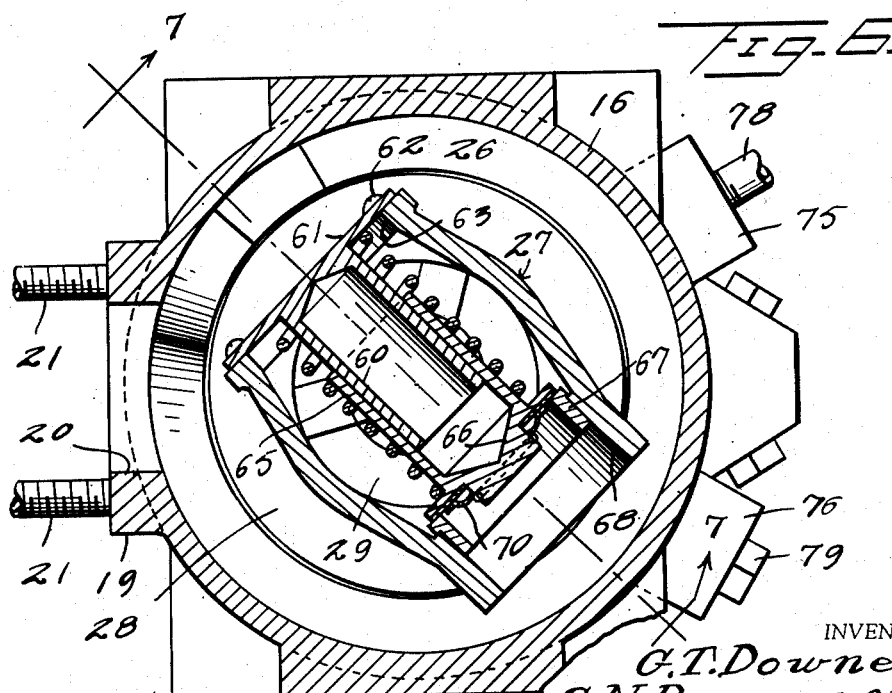

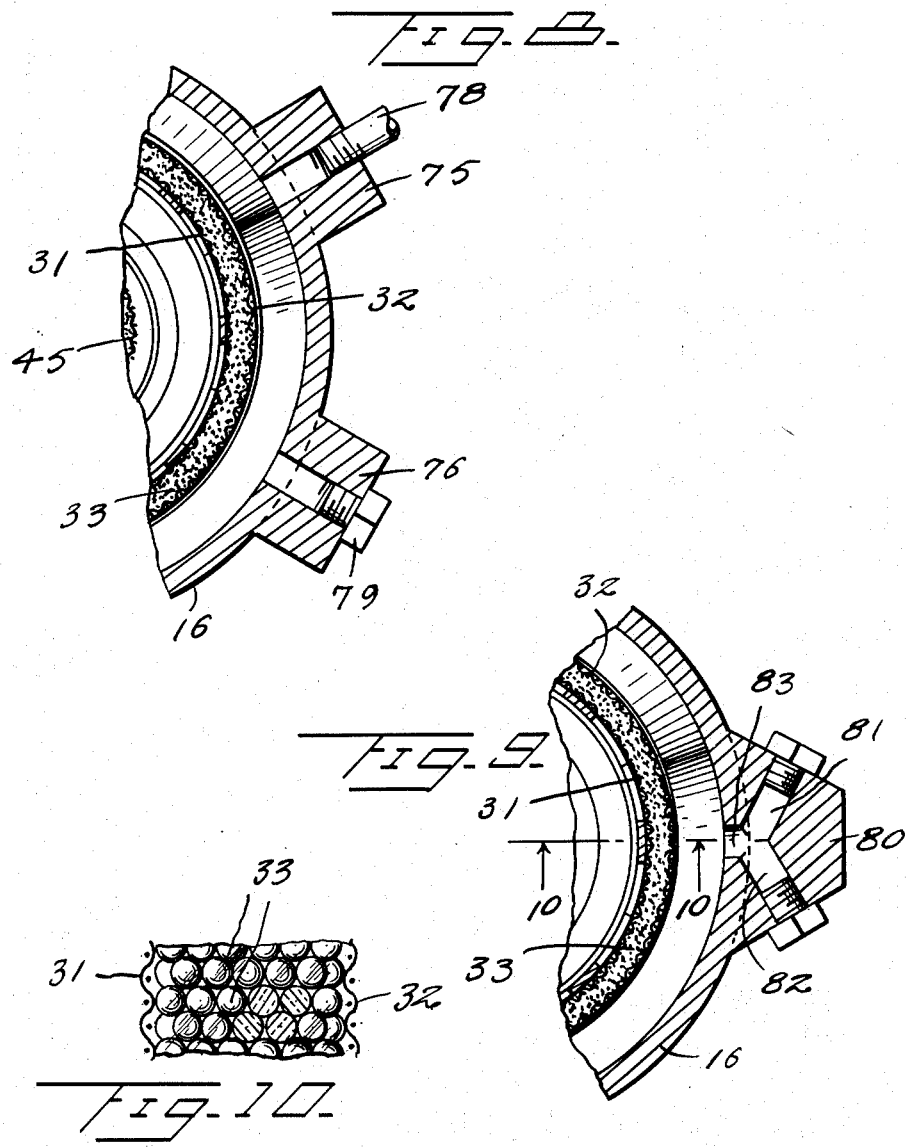

Patented May 12, 1953

2,638,228

UNITED STATES PATENT OFFICE 2,638,228

FLUID FILTER

George T. Downey, Swan N. Rosengren, and Robert E. Forrester, Corry, Pa., assignors to Aero Supply Mfg. Co., Inc., Corry, Pa., a corporation of Pennsylvania Application December 26, 1950, Serial No. 202,678

2 Claims. (Cl. 210—183)

This invention relates to fluid filters.

An object of this invention is to provide a filter which will thoroughly clean the desired fluid, such as gasoline, oil, or air with the fluid under a predetermined pressure.

Another object of this invention is to provide a fluid filter wherein the filter element is cleanable.

A further object of this invention is to provide in a filter unit means whereby the incoming liquid is given a spiral motion about the outer one of a pair of filter elements so as to produce a vortex and permit the solids to drop downwardly to a sump.

A further object of this invention is to provide an improved filter element which is formed of a pair of concentric screens having balls therebetween, the balls being formed of glass or other hard and non-corrosive material. Filtration fineness is attained by controlling the screen mesh with respect to diameter of glass balls.

A further object of this invention is to provide a spring-pressed overload valve which is disposed between the inlet and outlet chambers so as to permit the fluid to by-pass the filter elements in the event the pressure differential of the fluid exceeds a predetermined limit due to clogging of the filter elements or to increase in pressure of the fluid due to other causes.

With the above and other objects in view, our invention consists in the arrangement, combination and details of construction disclosed in the drawings and specification, and then more particularly pointed out in the appended claims.

In the drawings:

Figure 1 is a detail front elevation of a fluid filtering device constructed according to an embodiment of this invention.

Figure 2 is a detail side elevation of the device.

Figure 3 is a plan view of the device.

Figure 4 is a vertical section taken on the line 4—4 of Figure 3.

Figure 5 is a sectional view taken on the line 5—5 of Figure 4.

Figure 6 is a sectional view taken on the line 6—6 of Figure 7.

Figure 7 is a sectional view taken on the line 7—7 of Figure 6.

Figure 8 is a fragmentary sectional view taken on the line 8—8 of Figure 4.

Figure 9 is a fragmentary sectional view taken on the line 9—9 of Figure 4.

Figure 10 is a fragmentary sectional view on an enlarged scale taken on the line 10—10 of Figure 9.

Referring to the drawings the numeral 15 designates generally a housing formed of a cylindrical side wall 16, a lower head 17, and an upper head 18. The side wall 16 has disposed adjacent the upper portion thereof a boss 19 formed with an intake port 20 and a plurality of bolts 21 are threaded into the boss 19 whereby a fluid supply line may be coupled to the intake boss 19.

The upper head 18 is formed of a circular plate 22 having a centrally disposed boss 23 which is formed with an outlet port 24. A plurality of upstanding bolts 25 are carried by the boss 23 and provide a means whereby a fluid line may be coupled to the outlet of the filter structure. The cylindrical side wall 16 has secured to the inner side thereof a spirally disposed vane 26, the purpose for which will be hereinafter described. A depending housing 27 is fixed to and depends from the inner side of the upper head 18 and divides the upper portion of the housing 15 into an inlet chamber 28 and an outlet chamber 29.

An outer cylindrical filter element generally designated as 30 extends from the housing 27 and comprises inner and outer screen members 31 and 32 which have disposed therebetween a plurality of glass balls 33. A perforate reinforcing or bracing member 34 engages on the inner side of the inner screen member 31 and the upper ends of the bracing member 34 and the screen members 31 and 32 are seated in a rabbet 35 which is formed in a ring 36. The ring 36 engages in a rabbet 37 which is formed in an annular flange or ring 38 carried by the lower end of the housing 27, and the gasket 39 is interposed between the ring 36 and the ring 38.

A lower plate 40 of circular configuration is formed with a rabbet 41 within which the lower ends of the screens 31 and 32 engage and within which the bracing webbing 34 also engages. An inner filter member generally designated as 42 is disposed concentrically within the outer filter member 30 being substantially smaller in diameter than the inner diameter of the outer filter member 30 so as to thereby form a substantial space 43 therebetween. The inner filter member 42 is constructed identical with the outer filter member 30 being formed with inner and outer screens 44 and 45 with spherical members such as balls or the like interposed between the two screens after the manner shown in Figure 10. A bushing 46 is threaded into the plate 40 and is formed with an upwardly offset ring 47 having a rabbet 48 within which the lower end of the filter member 42 is adapted to engage.

The housing 27 has disposed centrally thereof and in downwardly offset position a bushing 49 which is carried by spider arms 50 formed integral with and projecting downwardly from the housing 27. A bolt 51 is threaded into the bushing 49 extending centrally and downwardly through the inner member 42. A sleeve 52 is threaded on the lower end of bolt 51, and a nut head 53 is carried by the lower end of the sleeve 52 and is adapted to abut against the bottom wall 54 of the lower head 17.

A circular plate 55 is loosely disposed about the sleeve 52 and is provided with a series of openings 56 by means of which fluid may enter the interior of the inner filter member 42 after passing downwardly through the space between the outer filter member 30 and the side wall 16. A spring 57 is interposed between the bottom wall 54 and the plate 55 so as to yieldably hold plate 55 into engagement with bushing 46. A split ring 58 is carried by the sleeve 52 above plate 55 so that the plate 55 will be held against disengagement from the sleeve 52.

The housing 27 as shown in Figures 6 and 7 has disposed therein an overload or relief valve structure generally designated as 59. The valve structure 59 includes a sleeve 60 carried by a plate 61 secured by fastening means 62 to the housing 27. The sleeve 60 forms a guide and projects through an opening 63 formed in the housing 27. A spring pressed valve member generally designated as 64 slidably engages about the guide sleeve 60 and includes a cylindrical member 65 telescoping over the guide sleeve 60.

A head or plug member 66 is carried by the cylindrical member 65 and is disposed in confronting position to a valve seat member 67 which is disposed in a port or opening 68 formed in the housing 27 oppositely from the opening 63. A gasket 69 is disposed on the outer side of the head or plug 66 and is held thereon by means of a pressure ring 70 which is locked by means of a split locking ring 71. The upper head 18 has extending angularly therefrom a boss 72 formed with a port 73 communicating with the outlet chamber 29.

A straight threaded fitting 74 is adapted to be threaded into the boss 72 and is adapted to be connected to an outlet pressure indicating meter. The side wall 16 is formed between the upper and lower ends thereof with a pair of circumferentially spaced apart bosses 75 and 76 which communicate with the space or filter chamber 77 disposed between the outer filter member 30 and the side wall 16.

A straight threaded fitting 78 is threaded into one of the bosses 75 or 76, and in the present instance is threaded into boss 75 and is adapted to be connected to a pressure meter for indicating the inlet pressure within the housing 15. The other boss such as boss 76 is closed by means of a threaded plug 79. The housing 15 has projecting laterally therefrom at a point below the bosses 75 and 76 a truncated triangular projection 80 which, as shown in Figure 9, is formed with a pair of obtusely disposed openings 81 and 82 which communicate with an opening 83. The opening 83 is disposed in the side wall 16 and communicates with the chamber 77 so that in the event any ice should form within the housing and about the filter elements a de-icing fluid may be discharged into the housing.

The lower head 17 is formed with a truncated conical wall 84 which includes an annular flange 85 telescoping within the lower end of the side wall 16. A boss 86 is carried by the lower wall 84 and is formed with a drain opening 87 within which a drain plug 88 is adapted to be normally disposed. The space 89 within the lower head 17 below the plate 55 forms a sump or collector within which water, dirt, dust, or solid particles are adapted to be collected. The housing 15 is formed adjacent the upper end thereof with a pair of diametrically opposed triangular bosses 90 having openings 91 (see Fig. 2) within which supporting bolts are adapted to engage for supporting the housing 15 from a suitable supporting element.

The housing 15 may be supported from either side thereof, and it will be understood that the pressure indicating pipe 78 will be disposed in the boss projecting from the support, and the pipe which may be connected with the projection 80 will be extended into the outer one of the openings 81 or 82.

In the use and operation of this filter the intake member 19 is connected to a source of fluid pressure, and the outlet boss 23 is connected to a source of fluid consumption such as an internal combustion engine or the like. The upper head 18 is so mounted on the housing or side wall 16 that the pressure relief valve structure 59 will be disposed with the relief opening 68 disposed remote from the intake port 20. In this manner the incoming pressure force will not be applied directly to the relief valve and thereby cause the relief valve to move to open position before a predetermined excess pressure differential is built between the inlet and outlet chambers 28 and 29. The fluid entering the intake chamber 28 will be given a spiral movement downwardly in the filter chamber 77, and the fluid may pass through the outer filter member 30 into the intermediate chamber 43.

A certain proportion of the liquid may pass downwardly to the bottom of the housing 15 and rise through the openings 56 into the interior of the inner filter member 42.

The inner filter member 42 has a cap plate 92 secured to the upper end thereof and through which the bolt 51 extends so that the liquid entering the interior of the inner filter member 42 will have to pass through the filter screens 44 and 45 and the filter members, such as 33, which are positioned between the screens 44 and 45. The liquid passing upwardly in the intermediate chamber 43 will flow into the outlet chamber 29 and through the outlet port 24. The pressure in the inlet chamber 28 can be determined by the meter or indicating means connected with fitting 78, and the outlet pressure in outlet or exhaust chamber 29 can be determined by the meter or indicating member connected with fitting 74.

This filter structure will provide a means whereby liquid such as gasoline or the like will be thoroughly filtered and the construction of the filter unit is such that the dirt particles will be carried downwardly into the sump 89, and fluid flow through inner filter and down vertically by outer filter elements will have the effect of maintaining the filter element in a relatively clean condition. The filter elements may be washed by a localized fluid pressure blast which will displace the spheres or balls sufficiently to allow dirt to be blown through the elements. The degree of filtration can be regulated or controlled by varying the mesh of the screens and the diameters of the balls or spheres which are positioned between the screens.

What is claimed is:

1. A fluid filtering device comprising a housing formed of a cylindrical side wall, upper and lower heads secured to the ends of said side wall, said upper head having an outlet port, an inwardly projecting housing carried by said upper head, said side wall having an inlet port adjacent said second named housing, said second named housing forming an outlet chamber and the space between said second named housing and said side wall comprising an inlet chamber, cylindrical filter means comprised of spaced inner and outer concentric foraminous cylindrical members, balls between said cylindrical members fixed relative to said second named housing and projecting therefrom a perforate bracing member on the inner side of the inner cylindrical screen member, a spiral vane between said outer cylindrical member and said side walls for effecting a spiral motion to the fluid about said filter means, a spring-pressed perforated plate carried by said lower head abutting the lower end of said inner cylindrical member whereby fluid may enter the interior of said inner cylindrical member, and a spring-pressed inwardly opening relief valve carried by said second named housing whereby the fluid in said inlet chamber may by-pass said filter means when the pressure of fluid in said inlet chamber exceeds a predetermined degree.

2. The structure of claim 1 wherein a centrally positioned bolt extends from the exterior of said lower head to the bottom of said housing, and a sleeve disposed about the lower portion of the bolt serves as a guide for said spring-pressed perforated plate.

GEORGE T. DOWNEY.
SWAN N. ROSENGREN.
ROBERT E. FORRESTER.

References Cited in the file of this patent

UNITED STATES PATENTS

| Number | Name | Date |
|---|---|---|
| 520,293 | Blackmore | May 22, 1894 |
| 634,060 | Leland | Oct. 3, 1899 |
| 1,166,000 | Pelton | Dec. 28, 1915 |
| 1,822,006 | Bull | Sept. 8, 1931 |
| 2,057,219 | Vokes | Oct. 13, 1936 |
| 2,063,742 | Holmes | Dec. 8, 1936 |
| 2,093,311 | Craig | Sept. 14, 1937 |
| 2,262,529 | Fairlie et al. | Nov. 11, 1941 |
| 2,354,645 | Bateman | Aug. 1, 1944 |
| 2,454,982 | Wallace | Nov. 30, 1948 |
| 2,462,612 | Craig | Feb. 22, 1949 |

FOREIGN PATENTS

| Number | Country | Date |
|---|---|---|
| 523,919 | Great Britain | July 25, 1940 |